United States Patent
Lee et al.

(10) Patent No.: US 8,070,944 B2
(45) Date of Patent: Dec. 6, 2011

(54) GROUNDWATER RADON REDUCTION APPARATUS

(75) Inventors: Kil Yong Lee, Daejon (KR); Yoon Yeol Yoon, Daejon (KR); Kyung Seok Ko, Daejon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 12/638,425

(22) Filed: Dec. 15, 2009

(65) Prior Publication Data
US 2010/0282086 A1    Nov. 11, 2010

(30) Foreign Application Priority Data
May 7, 2009    (KR) .................. 10-2009-0039927

(51) Int. Cl.
*B01D 19/00*    (2006.01)
(52) U.S. Cl. .............. 210/188; 96/204; 290/43; 290/53; 290/54
(58) Field of Classification Search ............ 96/206; 60/398, 325, 327, 639; 290/53, 43
See application file for complete search history.

(56) References Cited

U.S. PATENT DOCUMENTS

| | | | | |
|---|---|---|---|---|
| 2,027,666 | A * | 1/1936 | Bedford | 475/92 |
| 4,246,753 | A * | 1/1981 | Redmond | 60/398 |
| 4,939,945 | A * | 7/1990 | Ryder et al. | 74/89.13 |
| 5,236,595 | A * | 8/1993 | Wang et al. | 210/669 |
| 5,685,976 | A | 11/1997 | Lamarre | |
| 6,123,750 | A | 9/2000 | Espinal | |
| 6,365,984 | B1 * | 4/2002 | Shu | 290/53 |
| 6,981,376 | B2 * | 1/2006 | Dutta | 60/639 |
| 7,222,487 | B1 * | 5/2007 | Hinkley | 60/639 |
| 7,494,592 | B2 * | 2/2009 | Deskins | 210/712 |
| 2006/0207430 | A1 | 9/2006 | Huang et al. | |
| 2010/0201134 | A1 * | 8/2010 | Erdogan | 290/1 C |

FOREIGN PATENT DOCUMENTS

| | | |
|---|---|---|
| CN | 101358814 | 2/2009 |
| JP | 05-087981 | 4/1993 |
| KR | 20-0247245 | 10/2001 |
| KR | 1020020064601 A | 8/2002 |
| KR | 20-0293090 | 10/2002 |
| KR | 1020020078438 A | 10/2002 |
| KR | 1020030049949 A | 6/2003 |
| KR | 1020040061155 A | 7/2004 |
| WO | WO 9606044 | 2/1996 |

OTHER PUBLICATIONS

Notice of European Search Report from STET on Jul. 22, 2010.
"Results of Investigation of Actual Conditions of Radioactive Materials in Underground Water and Detailed Survey in 2008", pp. 1-21, Ministry of Environment of Korea, Feb. 2009, Republic of Korea.

* cited by examiner

*Primary Examiner* — Duane Smith
*Assistant Examiner* — Ives Wu
(74) *Attorney, Agent, or Firm* — IP & T Group LLP

(57) ABSTRACT

A groundwater radon reduction apparatus is provided. The groundwater radon reduction apparatus includes: a housing in which groundwater falls down; a rotating member installed in the housing and rotated by a falling force of the groundwater to form the groundwater into water drops; a plurality of power transmission members connected to both ends of the rotating member to transmit power, and receiving the rotating force of the rotating member; and a plurality of ventilation units coupled to one ends of the power transmission members inside the housing, respectively, and rotated together with the power transmission members by the rotation force of the rotating member to discharge radon gases within the water drops to the outside.

12 Claims, 5 Drawing Sheets

GROUNDWATER RADON REDUCTION APPARATUS

CROSS-REFERENCE(S) TO RELATED APPLICATIONS

The present application claims priority of Korean Patent Application No. 10-2009-0039927, filed on May 7, 2009, and issued on Aug. 3, 2009 as Patent No. 10-0911416, which is incorporated herein by reference in its entirety.

BACKGROUND OF THE INVENTION

1. Field of the Invention

Exemplary embodiments of the present invention relate to an apparatus capable of reducing radon in the groundwater.

2. Description of Related Art

Recently, as an interest in radon (Rn-222) increases and the number of people who want to escape from crowded and polluted cities and enjoy a rural life increases, it has become important to measure whether or not groundwater used as drinking water is contaminated by radon.

Radon is a carcinogenic substance. When radon is introduced into the human body through respiratory organs, it may cause a lung cancer. When radon is introduced into the human body through a digestive organ, it may cause a stomach cancer. When contaminated groundwater is used as drinking water, it may increase the probability that the stomach cancer occurs. Furthermore, although contaminated groundwater is not used as drinking water but used as daily life water, a secondary contamination of indoor air may increase the occurrence probability of the lung cancer.

Radon is a colorless, odorless, tasteless noble gas, occurring naturally as the decay product of uranium (U-238). Radon is one of radioactive isotopes having a half-life of 3.8 days. Since radon emits alpha particles during the radioactive decay, it is known as a harmful substance for the human body. As described above, the lung cancer which is caused by inhaling radon in a gas state is most widely known as the harmfulness of radon for the human body. In accordance with the research material of the US Environment Protection Agency (EPA), radon exposure is thought to be the second major cause of lung cancer after smoking. Some countries have a radon concentration guideline. The US recommends that action should be taken starting from concentrations of 4,000 pCi/L (guideline), Finland recommends that action should be taken starting from concentrations of 8,100 pCi/L (based on drinking water), and Norway recommends that action should be taken starting from concentrations of 13,500 pCi/L (guide line).

In accordance with the information on measurement results of radon, about 10% of groundwater in Korea is thought to be contaminated by radon. Furthermore, it has been reported that a radon concentration of several thousands pCi/L is detected in groundwater of some regions. In this case, the groundwater cannot be used as drinking water.

In Korea, the actual conditions of natural radioactive substances contained in groundwater have been investigated by Ministry of Environment (MOE) since 1998. In 2008, 523 water supplies throughout the nation were investigated, which were expected to have a high natural radioactive substance content due to the geological characteristics. In accordance with the investigation result, it was checked that radon concentrations of 124 places exceeded the guideline of the US. The management of the places has been strengthened. Furthermore, MOE has operated radon reduction facilities for water supplies having a high radon concentration by way of showing an example. As a result, the effects of aeration and activated carbon and the possibility of reduction management were confirmed.

SUMMARY OF THE INVENTION

An embodiment of the present invention is directed to a groundwater radon reduction apparatus which effectively reduces radon contained in groundwater by forming the groundwater into water drops when the groundwater falls down to collide with a rotating member, and may drive the rotating member only with the falling force of the groundwater without separate power.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a groundwater radon reduction apparatus includes: a housing in which groundwater falls down; a rotating member installed in the housing and rotated by a falling force of the groundwater to form the groundwater into water drops; a plurality of power transmission members connected to both ends of the rotating member to transmit power, and receiving the rotating force of the rotating member; and a plurality of ventilation units coupled to one ends of the power transmission members inside the housing, respectively, and rotated together with the power transmission members by the rotation force of the rotating member to discharge radon gases within the water drops to the outside.

The rotating member may include: a rotating shaft; a plurality of impellers protruding from an outer circumference of the rotating shaft in a plurality of directions; and a first gear member formed at both ends of the rotating shaft.

Each of the power transmission members may include a transmission shaft vertically connected to either end of the rotating shaft, and a second gear member formed at one end of the transmission shaft so as to be geared and rotated with the first gear member.

The first and second gear members may have a different number of screw threads from each other to increase or decrease a reduction ratio such that the rotation speed of the ventilation units is controlled.

The plurality of impellers may be formed to protrude from the outer circumference of the rotating shaft.

The impellers may have a cross section formed in a straight or bent line.

The plurality of ventilation units may be positioned at a plurality of ventilation holes formed at the upper part of the housing, respectively, to discharge radon gases to the outside.

Each of the ventilation holes may include a cover formed in a hemispherical shape so as to prevent foreign matters from being introduced into the housing, and an auxiliary member protruding in a hemispherical shape from an inner circumference of the cover such that the radon gases discharged to the outside through the ventilation hole flows smoothly.

The housing may include an inlet pipe installed at an upper end part of the housing and connected to a groundwater storage tank through a transfer line to introduce groundwater into the housing, and an outlet pipe connected to the groundwater storage tank at a lower end part of the housing to discharge the falling groundwater into the groundwater storage tank. The groundwater inside the groundwater storage tank may circulate.

One end of the outlet pipe may be connected to protrude to the inside of the housing such that the groundwater from which radon gases are reduced is stored in the housing for a predetermined time and then discharged to the outside, in order to provide a sufficient time for the discharge of the radon gases within the water drops.

The outlet pipe may include a filter installed at the one end thereof which is connected protrude to the inside of the housing, and the filter may prevent foreign matters from being introduced to the groundwater storage tank together with the groundwater and may be formed of stainless steel.

DESCRIPTION OF SPECIFIC EMBODIMENTS

Figure 1:
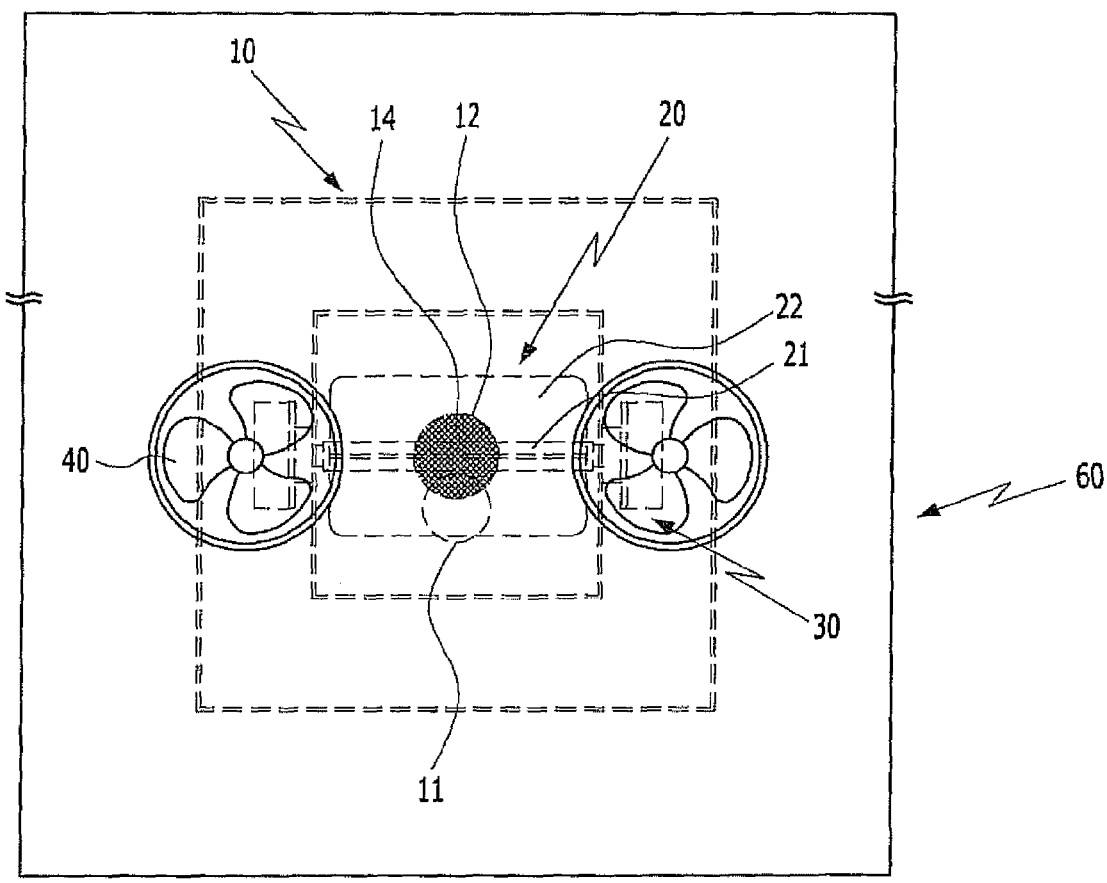
FIG. 1 is a plan view of a radon reduction apparatus in accordance with an embodiment of the present invention.
Figure 2:
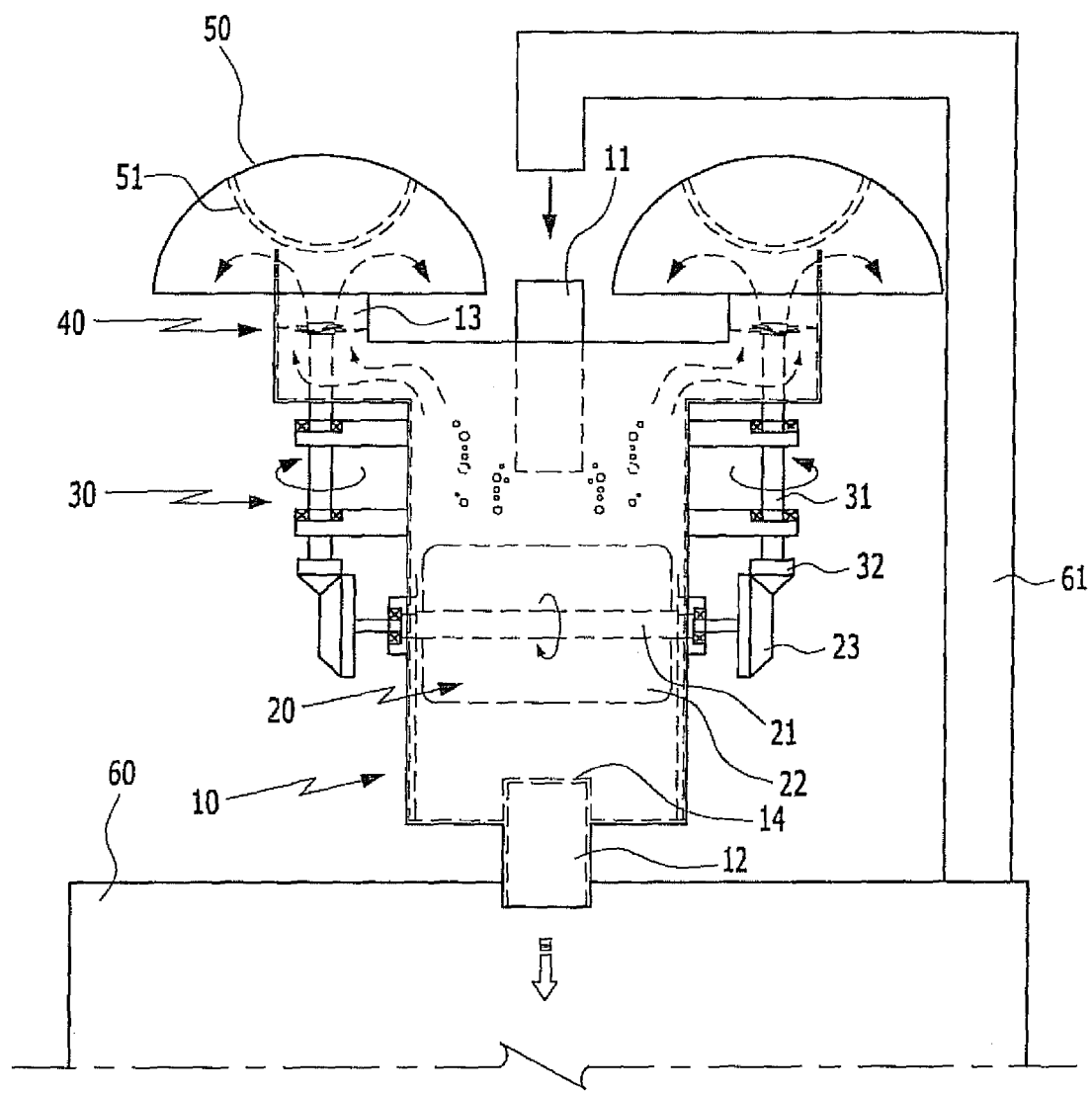
FIG. 2 is a front view of the radon reduction apparatus in accordance with the embodiment of the present invention.

Before exemplary embodiments of the present invention are described in detail, it will be found that the application of the present invention is not limited to the detailed construction and arrangement of components described or illustrated in the detailed descriptions or the drawings. The present invention may be implemented and embodied as various embodiments and performed by various methods. Furthermore, expressions and sentences which are used in this specification including terms such as devices or element directions (for example, "front", "back", "up", "down", "top", "bottom", "left", "right", and "lateral") are used only to simplify the descriptions of the present invention, and it does not simply indicate or mean that the related devices or elements should have a specific direction. Furthermore, terms such as "first" and "second" which are used in this specification and the attached claims are not intended to indicate or mean a relative importance or purport.

The present invention has the following features to accomplish the above-described purpose.

Hereafter, exemplary embodiments of the present invention will be described in more detail with reference to the accompanying drawings. Terms or words used in this specification and the attached claims should not be limited to typical or lexical meanings, but should be analyzed as meanings and concepts which correspond with the technical spirit of the present invention, based on a principle in which the inventor can properly define the concepts of the terms to explain the invention through the best method.

Therefore, the embodiments described in this specification and the constructions illustrated in the drawings are only preferred embodiments of the present invention, and may not describe the technical spirit thoroughly. Accordingly, it should be understood that various equivalents and modifications which can substitute the embodiments may be provided at a point of application time of this specification.

The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Hereafter, a groundwater radon reduction apparatus in accordance with an embodiment of the present invention will be described in detail with reference to FIGS. 1 to 5.

Referring to FIG. 1, the groundwater radon reduction apparatus in accordance with the embodiment of the present invention includes a housing 10, a rotating member 20, a plurality of power transmission members 30, and a plurality of ventilation units 40.

The housing 10 has a hollow inside, an upper end part connected to an inlet pipe 11, and a lower end part connected to an outlet pipe 12. The inlet pipe 11 is connected through a transfer line 61 to a groundwater storage tank 60 storing groundwater such that the groundwater may flow therethrough.

In this embodiment of the present invention, the housing 10 is installed at the upper end of the groundwater storage tank 60 in which the groundwater is stored. However, the position of the housing 10 may be changed in various manners depending on the selection of users, as long as the groundwater can circulate in order of the groundwater storage tank 60, the inlet pipe 11, the housing 10, and the outlet pipe 12.

Furthermore, the housing 10 includes a plurality of ventilation holes 13 formed at the upper end part thereof.

The rotating member 20 is installed inside the housing 10 so as to be set horizontally with the ground surface. The rotating member 20 is positioned in the lower end side of the inlet pipe 11 and rotated by a falling force of groundwater which is introduced from the inlet pipe 11 to fall down.

While the rotating member 20 is rotated by the falling force of the groundwater, the groundwater collides with the rotating member 20 to form water drops. At this time, radon gases are discharged to the air inside the housing 10.

Figure 3:
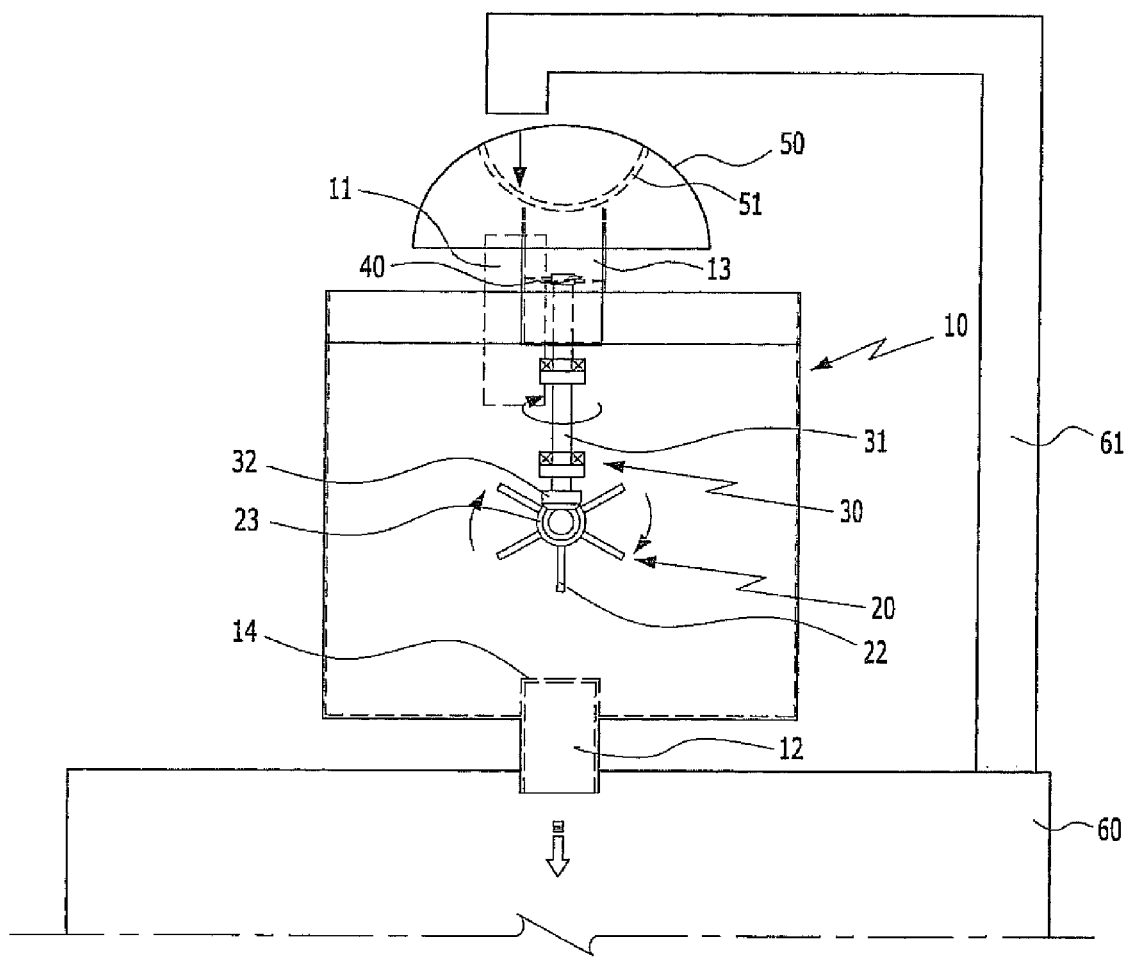
FIG. 3 is a side view of the radon reduction apparatus in accordance with the embodiment of the present invention.
Figure 4:
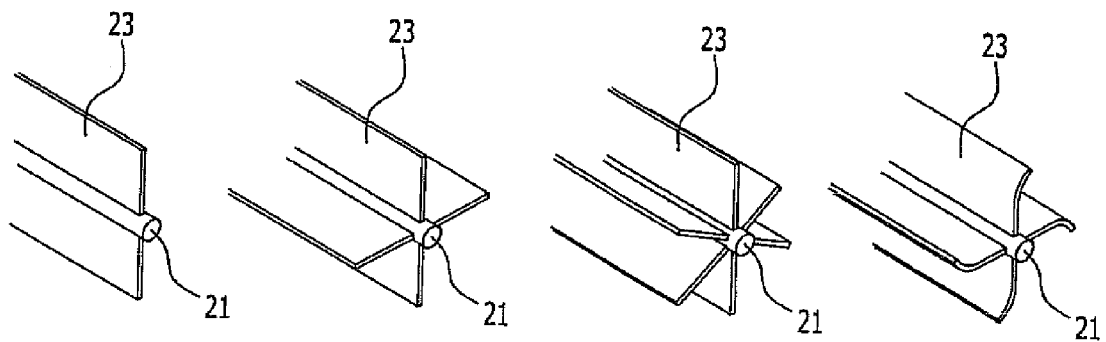
FIG. 4 is a perspective view of a rotating member of the radon reduction apparatus in accordance with the embodiment of the present invention.
Figure 5:
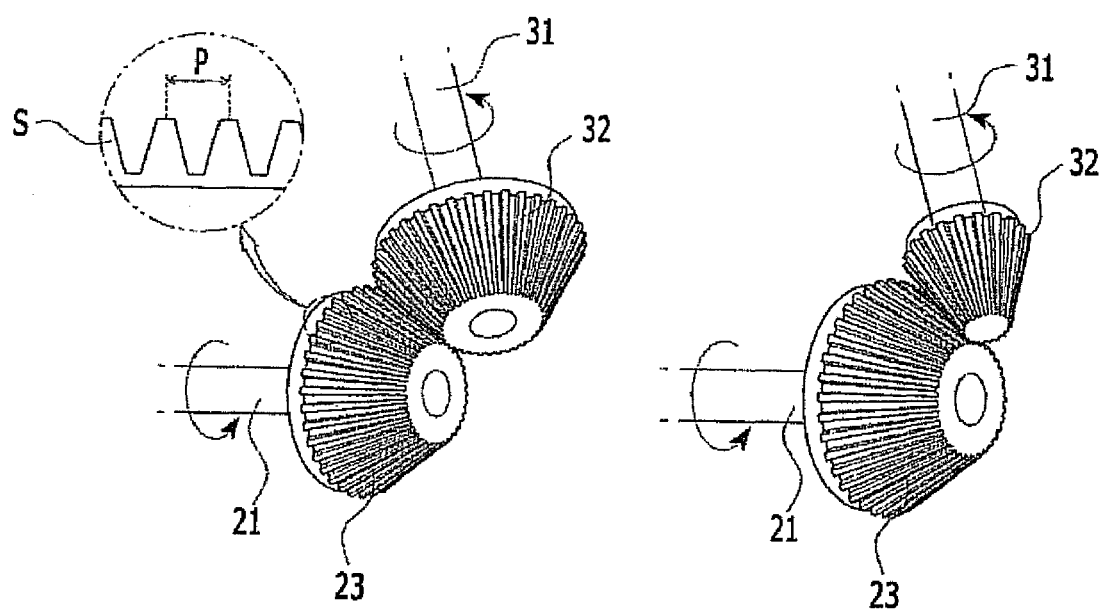
FIG. 5 is a diagram illustrating first and second gear member of the radon reduction apparatus in accordance with the embodiment of the present invention, showing a state in which the first and second gear members are geared and rotated.

The rotating member 20 includes a rotating shaft 21 having both ends protruding to the outside of the housing 10, a plurality of impellers 22 protruding from the outer circumference of the rotating shaft 21 in a plurality of directions, and a first gear member 23 formed at both protruding ends of the rotating shaft 21. At this time, in order that the groundwater collides with the impeller 22 to rotate the rotating member 20, the position of the inlet pipe 11 formed in the housing 10 may be set to correspond to the upper part of the impeller 22, not the rotating shaft 21, as illustrated in FIGS. 3 and 4.

The plurality of impellers 22 may have a cross-section formed in a straight line or C or S shape. When the impellers 22 are formed in a C or S shape, the impellers 22 may be bent a single time or multiple times. The number of times may be changed depending on the selection of users.

Each of the power transmission members 30 receives the rotation force of the rotating member 20 which is rotated by the falling force of the groundwater without power. The power transmission member 30 is positioned at both ends of the rotating member 20 and includes a transmission shaft 31 which is set perpendicular to the rotating shaft 21, a second gear member 32 which is formed at one end of the transmission shaft 31 and geared and rotated with the first gear member 23, and the ventilation unit 40 which is fixed to the other end of the transmission shaft 31.

At this time, since one end of the transmission shaft 31 is geared with the first gear member 23 at both ends of the rotating shaft 21 protruding to the outside of the housing 10, the one end of the transmission shaft 31 is positioned outside the housing 10, like the first gear member 23. However, the other end of the transmission shaft 31 to which the ventilation unit 40 is fixed is introduced into the housing 10 so as to be positioned at the ventilation hole 13 formed at the upper part of the housing 10.

A bevel gear is used as the second gear member 32 as well as the above-described first gear member 23, in order to transmit the rotation force of the rotating shaft 21 in the vertical direction, which is installed inside the housing 10 so as to be set horizontally with the ground surface. However, the bevel gear may be substituted with another gear such as a worm gear depending on the selection of users.

The first gear member 23 has a different number of screw threads S from that of the second gear member 32, in order to increase or decrease a reduction ratio. Accordingly, the speed of the ventilation unit 40 rotated by the rotation of the rotating member 20 may be controlled. That is, the first and second gear members 23 and 32 are formed to have a different diameter such that the numbers of screw threads formed on the respective gear members may be adjusted, or a pitch P between screw threads may be adjusted. For example, a ratio of the number of screw threads of the first gear member 23 to that of the second gear member 32 may be set to 10:1. In this case, when the first gear member 23 is rotated one time, the second gear member 32 is rotated ten times. Then, the speed increases. On the other hand, when the ratio is set to 1:10, the speed decreases.

In other words, when the groundwater collides with the rotating member 20 to rotate the rotating member 20, the rotation force of the rotating member 20 is transmitted through the power transmission member 30 to rotate the ventilation unit 40. Radon gases within water drops formed by the collision of the groundwater with the rotating member 20 are discharged to the outside through the ventilation units 40 at the plurality of ventilation holes 13, which are rotated with the rotating member 20.

The groundwater having passed through the inlet pipe and the rotating member 20 falls down to the bottom surface of the housing 10. Then, the groundwater from which radon is reduced is again introduced into the groundwater storage tank 60 through the outlet pipe 12. At this time, in the outlet pipe 12 of which both ends are connected to the housing 10 and the groundwater storage tank 60, one end of the outlet pipe 12 at which a filter 14 is attached toward the inside of the housing 10 is connected to protrude a predetermined distance to the inside of the housing 10. The filter 14 is formed of stainless steel. However, the material of the filter 14 may be changed to various other materials by users.

That is, when the groundwater from which radon is reduced falls down to the bottom surface of the housing 10, the groundwater is not directly introduced into the groundwater storage tank 60 through the outlet pipe 12, but temporarily stored in the lower part of the housing 10 corresponding to the protrusion length of the outlet pipe 12 which protrudes a predetermined distance from the bottom surface of the housing 10. Then, when the lower part of the housing 10 is filled with the groundwater, the groundwater overflows to be discharged through the outlet pipe 12. As such, when the groundwater is stored in the lower part of the housing 10 corresponding to the protrusion length of the outlet pipe 12 for a predetermined time and then discharged through the outlet pipe 12, a sufficient time may be provided for the discharge of radon gases within the water drops formed by the rotating member 20, and foreign matters such as rock powder contained in the groundwater may be filtered by the filter 14.

As described above, the ventilation unit 40 is formed at one end of the power transmission member 30. In this embodiment of the present invention, a fan is used as the ventilation unit 40. The fan may be substituted with different devices, as long as they are similar devices to the fan which is rotated to discharge radon gases inside the housing 10 to the outside.

The ventilation unit 40 is formed at one end of each of the plurality of power transmission members 30, and positioned at each of the plurality of ventilation holes 13 formed in the housing 10.

In order to prevent foreign matters, insects, rain, hail, or snow from being introduced from outside through the ventilation holes 13, each of the ventilation holes 13 includes a hemispherical cover 50 formed at the upper end thereof. The hemispherical cover 50 is formed in "∩" shape. Furthermore, the ventilation hole 13 includes an auxiliary member 51 formed inside the cover 50. The auxiliary member 51 formed in "∪" shape protrudes in a hemispherical shape toward the lower end. Therefore, the radon gases which are discharged to the outside through the ventilation hole 13 by the rotation of the ventilation unit 40 are smoothly discharged to the outside while being guided along the rounded outer circumference of the auxiliary member 51.

In accordance with the present invention, radon emitted at the same time when aeration or activated carbon is simply discharged is discharged in order to reduce radon in groundwater. Therefore, it is possible to effective remove radon dissolved in original water.

Furthermore, considering that most water supply tanks are positioned at high mountains with no electric facilities, radon in groundwater may be effectively reduced without electricity. Therefore, a separate cost is not required while the health of inhabitants using the groundwater is protected.

While the present invention has been described with respect to the specific embodiments, it will be apparent to those skilled in the art that various changes and modifications may be made without departing from the spirit and scope of the invention as defined in the following claims.

What is claimed is:

1. A groundwater radon reduction apparatus comprising:
a housing in which groundwater falls down;
a rotating member installed in the housing and rotated by a falling force of the groundwater, wherein the rotating member is configured to form water drops of the groundwater;
a power transmission member geared with and rotated with the rotating member to receive and transmit the rotating force of the rotating member; and
a ventilation unit coupled to an end of the power transmission member and located inside the housing, wherein the ventilation unit is geared with the rotating member through the power transmission member to receive the rotating force of the rotating member and discharge radon gases within the water drops to outside the housing,
wherein the ventilation unit is positioned at a plurality of ventilation holes that are formed at the upper part of the housing to discharge the radon gases to outside the housing.

2. The groundwater radon reduction apparatus of claim 1, wherein the rotating member comprises:
a rotating shaft;

a plurality of impellers protruding from an outer circumference of the rotating shaft in a plurality of directions, respectively; and a first gear member formed at each end of the rotating shaft.

3. The groundwater radon reduction apparatus of claim 2, wherein the power transmission member comprises:

a transmission shaft vertically connected to an end of the rotating shaft through a second gear member; and the second gear member formed at an end of the transmission shaft so as to be geared and rotated with the first gear member.

4. The groundwater radon reduction apparatus of claim 3, wherein the first and second gear members have different numbers of screw threads from each other to set the rotation speeds of the first and second gear members differently from each other.

5. The groundwater radon reduction apparatus of claim 2, wherein the plurality of impellers are formed in a C-shape or in an S-shape.

6. The groundwater radon reduction apparatus of claim 2, wherein the impellers have a cross section formed in a straight or bent line.

7. The groundwater radon reduction apparatus of claim 1, wherein each of the ventilation holes comprises:

a cover formed in a hemispherical shape so as to prevent foreign matters from being introduced into the housing; and an auxiliary member protruding in a hemispherical shape from an inner surface of the cover such that the radon gases discharged to outside the housing through the ventilation hole flow smoothly.

8. The groundwater radon reduction apparatus of claim 1, wherein the housing comprises:

an inlet pipe installed at an upper end part of the housing and connected to a groundwater storage tank through a transfer line to introduce groundwater into the housing; and an outlet pipe connected to the groundwater storage tank at a lower end part of the housing to discharge the falling groundwater into the groundwater storage tank, wherein the groundwater inside the groundwater storage tank circulates.

9. The groundwater radon reduction apparatus of claim 8, wherein an end of the outlet pipe is connected to protrude within the housing such that the groundwater from which the radon gases are reduced is stored in the housing for a time and then discharged to outside the housing in order to allow the discharge of the radon gases within the water drops.

10. The groundwater radon reduction apparatus of claim 8, wherein the outlet pipe comprises a filter installed at the end of the outlet pipe that is connected to protrude within the housing and the filter prevents foreign matters from being introduced to the groundwater storage tank and is formed of stainless steel.

11. The groundwater radon reduction apparatus of claim 1, wherein the ventilation unit includes a fan located within the housing.

12. The groundwater radon reduction apparatus of claim 1, wherein the rotating member is further configured to form the water drops of the groundwater for discharging the radon gases to air inside the housing and the ventilation unit is configured to discharge the radon gases in the air inside the housing to outside the housing.

* * * * *